US006807413B1

(12) United States Patent
Honda

(10) Patent No.: US 6,807,413 B1
(45) Date of Patent: Oct. 19, 2004

(54) MOBILE TERMINAL COMMUNICATION SYSTEM

(75) Inventor: Toshio Honda, Saitama (JP)

(73) Assignee: NEC Corporation, Tokyo (JP)

( * ) Notice: Subject to any disclaimer, the term of this patent is extended or adjusted under 35 U.S.C. 154(b) by 742 days.

(21) Appl. No.: 09/717,404

(22) Filed: Nov. 22, 2000

(30) Foreign Application Priority Data

Dec. 1, 1999 (JP) .......................................... 11-341612

(51) Int. Cl.[7] .............................................. H04M 3/42
(52) U.S. Cl. ............................... 455/414.1; 455/456.1; 455/509; 455/510; 455/511
(58) Field of Search .......................... 455/414.1, 456.1, 455/509, 510, 511, 512, 513, 514, 421, 422.1, 423

(56) References Cited

U.S. PATENT DOCUMENTS

| | | | | |
|---|---|---|---|---|
| 5,574,774 A | * | 11/1996 | Ahlberg et al. | 455/422.1 |
| 5,752,185 A | * | 5/1998 | Ahuja | 455/414.1 |
| 6,032,040 A | * | 2/2000 | Choy et al. | 455/414.1 |
| 6,061,559 A | * | 5/2000 | Eriksson et al. | 455/435.3 |

FOREIGN PATENT DOCUMENTS

| | | |
|---|---|---|
| JP | 5-145481 | 6/1993 |
| JP | 6-45990 | 2/1994 |
| JP | 9-307959 | 11/1997 |
| JP | 10-322768 | 12/1998 |
| WO | WO 00/33595 | 6/2000 |
| WO | WO 00/33597 | 6/2000 |

OTHER PUBLICATIONS

Copy of Japanese Patent Office office action issued on Mar. 22, 2002 with English translation of relevant portions.
English translation of the priority document for WO/0033597 dated Jul. 18, 2000.

* cited by examiner

*Primary Examiner*—Erika Gary
*Assistant Examiner*—Huy Nguyen
(74) *Attorney, Agent, or Firm*—Whitham, Curtis & Christofferson, PC

(57) ABSTRACT

A mobile terminal communication system is disclosed wherein, when communication interruption occurs, communication is re-started automatically without labor by a user to perform a call re-origination operation. If communication is interrupted by deterioration of a radio circuit condition between a fixed terminal and a mobile terminal, then an automatic call origination control section automatically originates a call to the fixed terminal and the mobile terminal based on subscriber number information stored in a subscriber number storage section of an exchange and information of a radio service area; in which the mobile terminal is present, stored in a position information database section. If a response is received from both of the fixed terminal and the mobile terminal, then communication is re-started.

3 Claims, 3 Drawing Sheets

MOBILE TERMINAL COMMUNICATION SYSTEM

BACKGROUND OF THE INVENTION

1. Field of the Invention

This invention relates to a mobile terminal communication system wherein radio communication is performed between a mobile terminal and another communication terminal through a radio base station apparatus.

2. Description of the Related Art

Since mobile terminal communication uses a radio circuit, communication interruption is much more likely to be caused by deterioration of a radio circuit condition or movement of the mobile terminal out of a radio service area than in communication in which a fixed terminal is used. Once communication interruption occurs, a call must be originated again from the origination side terminal or the termination side terminal to the other party terminal.

In this manner, the mobile terminal communication has a subject to be solved in that, once communication interruption occurs, a call must be originated again from the origination side or the termination side.

A similar scheme is disclosed, for example, in Japanese Patent Laid-Open No. 45990/1994. According to the scheme, a reception level value of a radio wave of a communication channel being received by a mobile terminal is detected. When the reception level value is lower than a prescribed value, one of level values of radio waves of communication channels of other radio base stations is selected. Then, the communication channel of the selected level value is used as one of dual communication circuits thereby to form communication channels with the two different radio base stations. However, the scheme does not successfully solve the subject described above as yet.

SUMMARY OF THE INVENTION

It is an object of the present invention to provide a mobile terminal communication system wherein, when communication interruption occurs, communication is re-started automatically without labor by a user to perform a call re-origination operation.

In order to attain the object described above, according to the present invention, if communication interruption occurs during communication between terminals, then a call is originated from a network side to the terminals and, only when a response is received from both of the terminals, communication is re-started automatically.

More particularly, according to the present invention, there is provided a mobile terminal communication system which allows radio communication between a mobile terminal and another communication terminal through a radio base station apparatus, comprising a subscriber number storage section provided in an exchange, which is a higher-rank apparatus than the radio base station apparatus, for temporarily storing subscriber numbers of origination and termination side terminals, a terminal type discrimination section provided in the exchange for discriminating from the subscriber numbers whether each of the communication terminals is a fixed terminal or a mobile terminal, a position information data base section provided in the exchange for storing, when a result of the discrimination by the terminal type discrimination section indicates that any of the communication terminals is a mobile terminal, current position information of the mobile terminal based on a position registration request signal from the mobile terminal, a communication end discrimination section provided in the exchange for discriminating whether or not the communication between the terminals has ended normally or abnormally, an automatic call origination control section provided in the exchange for automatically calling the terminals when a result of the discrimination by the communication end discrimination section indicates that the communication between the terminals has ended abnormally, and a timer section for causing the automatic call origination control section to operate for a fixed period of time.

In the mobile terminal communication system, subscriber numbers of origination and termination side terminals are temporarily stored into the subscriber number storage section of the exchange. Then, the terminal type discrimination section discriminates from the subscriber numbers whether each of the communication terminals is a fixed terminal or a mobile terminal. When the result of the discrimination indicates that any of the communication terminals is a mobile terminal, the position information database section stores current position information of the mobile terminal based on a position registration request signal from the mobile terminal.

If the communication between the terminals comes to an end in this state, then the communication end discrimination section discriminates whether or not the communication between the terminals has ended normally or abnormally. If the result of the discrimination by the communication end discrimination section indicates that the communication between the terminals has ended abnormally, then the automatic call origination control section operates for a fixed period of time under the control of the timer section. While the automatic call origination control section operates for the fixed period of time in this manner, it automatically calls the terminals. Then, only when a response is received from both of the terminals, re-starting of communication is enabled. Consequently, labor for performing a call re-origination operation can be eliminated.

Thus, even if interruption of communication occurs in mobile terminal communication, the two terminals are called automatically from the network side, and communication can be re-started when both terminals respond to the call. Consequently, the user of either terminal need not perform a call re-origination operation. Further, even if a mobile terminal moves into a different radio service area after occurrence of interruption of communication, the mobile terminal is called with the latest position information referred to. Consequently, there is an effect that the mobile terminal can be called without fail.

Preferably, when a radio circuit is disconnected by deterioration of a radio circuit condition or a like cause to interrupt the communication while the communication is proceeding between the origination side terminal and the termination side terminal, the automatic call origination control section automatically originates a call to the terminals based on the subscriber number information stored in the subscriber number storage section and radio service area information of an area or areas in which the mobile terminal or terminals are present stored in the position information database section, and re-starts communication if a response is received from both of the terminals.

Preferably, if any of the terminals moves into a different radio service area after it is discriminated that the communication between the terminals has ended abnormally, then the automatic call origination control section refers to new position information, which is stored into the position information database section when the terminal issues a position registration request in the radio service area after the movement, to call the mobile terminal having moved to the different radio service area.

Preferably, if any of the terminals does not respond within an automatic call origination time set in the timer section in advance, then the automatic call origination control section stops the terminal calling operation when the automatic call origination time elapses with the timer section.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
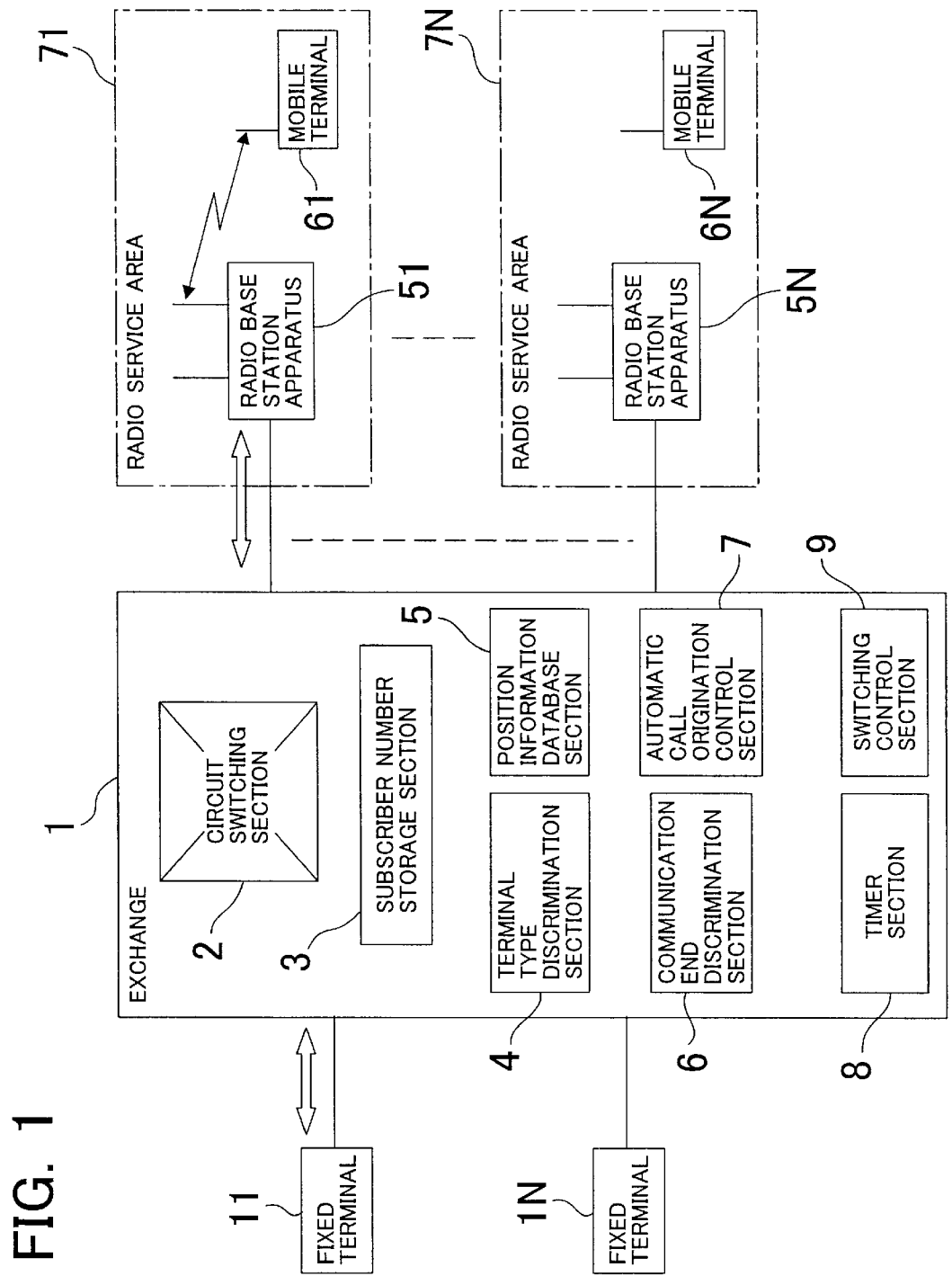
FIG. 1 is a functional block diagram showing a general construction of a mobile terminal communication system to which the present invention is applied.

Referring first to FIG. 1, there is shown a general configuration of a mobile terminal communication system to which the present invention is applied. The mobile terminal communication system shown includes an exchange 1, radio base station apparatus 51 to 5N, mobile terminals 61 to 6N, and fixed terminals 11 to 1N.

The exchange 1 performs circuit switching connection and includes a circuit switching section 2, a subscriber number storage section 3, a terminal type discrimination section 4, a position information database section 5, a communication end discrimination section 6, an automatic call origination control section 7, a timer section 8, and a switching control section 9.

The radio base station apparatus 51 to 5N which communicate with mobile terminals by radio through radio circuits have radio service areas 71 to 7N, respectively.

Figure 2:
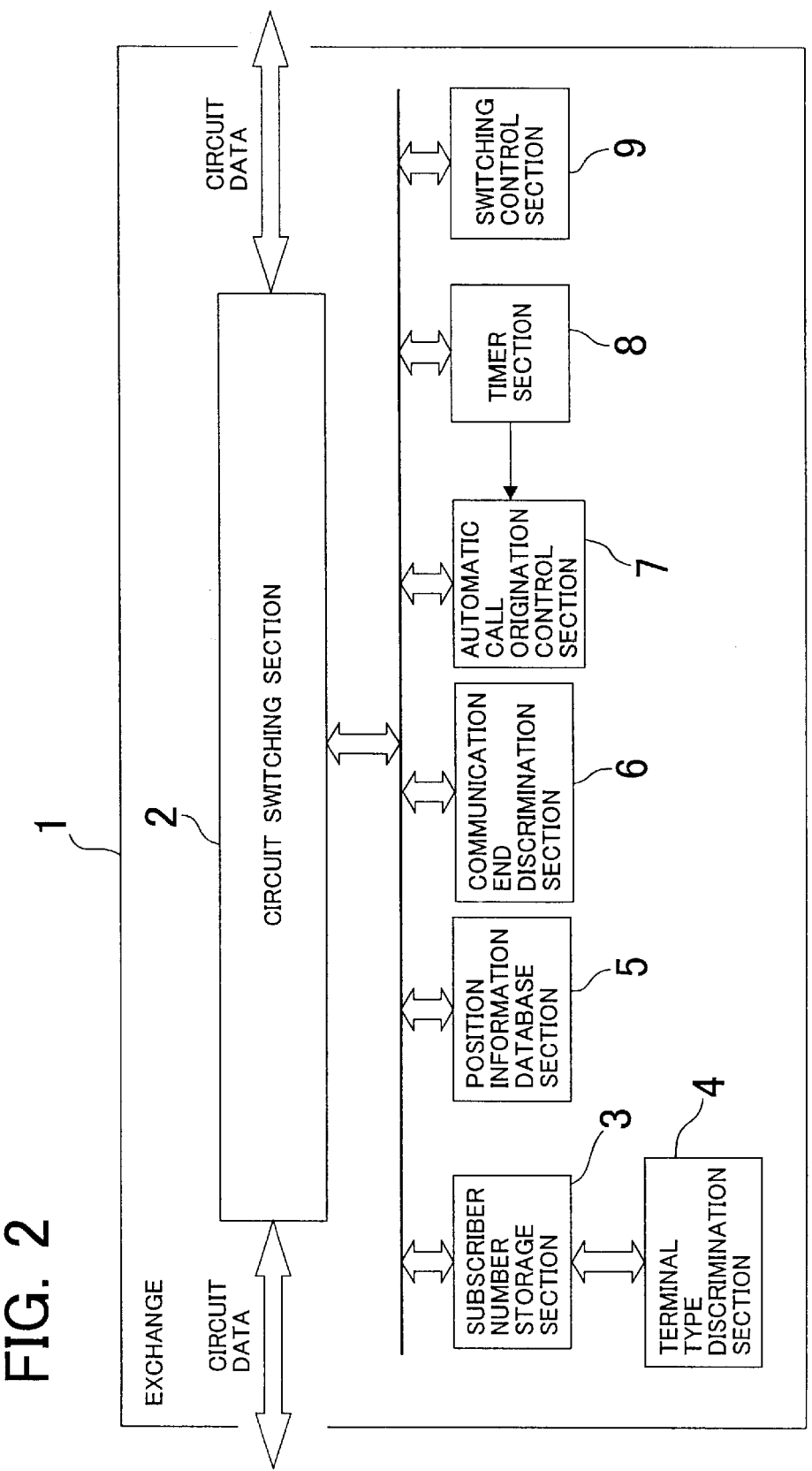
FIG. 2 is a functional block diagram of an exchange of the mobile terminal communication system shown in FIG. 1.

Subsequently, the individual components of the exchange 1 are described in detail with reference to FIG. 2 which shows a functional configuration of the exchange 1.

In the exchange 1, the circuit switching section 2 is a switch which performs circuit switching. The subscriber number storage section 3 reads in and stores subscriber numbers of origination and termination side terminals from a call establishment signal signaled from the origination side terminal to the network. The terminal type discrimination section 4 discriminates from the subscriber numbers stored in the subscriber number storage section 3 whether each of the terminals is a mobile terminal or a fixed terminal. The position information database section 5 stores information of in which radio service area the mobile terminal is currently present from a position registration request signal which was signaled from the mobile terminal upon position registration. The communication end discrimination section 6 discriminates whether or not the communication between the origination side/termination side terminals has ended normally. The automatic call origination control section 7 automatically calls, when the communication is interrupted by deterioration of a radio circuit condition or the like, the origination and termination side terminals based on the subscriber numbers stored in the subscriber number storage section 3 and the position information of the mobile terminal stored in the position information data base section 5. The timer section 8 supervises the terminal calling operation of the automatic call origination control section 7. The switching control section 9 controls operation of the entire exchange including a switching operation of the circuit switching section 2.

Operation of the mobile terminal communication system having the configuration described above is described below with reference to a flow chart of FIG. 3 in addition to FIGS. 1 and 2.

First, it is assumed that the origination side terminal is the fixed terminal 11 shown in FIG. 1 and the termination side terminal is the mobile terminal 61, and they are present in the radio service area 71.

At this time, the mobile terminal 61 has signaled a position registration request signal to the radio base station apparatus 51 to complete entry of position registration.

Accordingly, that the mobile terminal 61 is currently present in the radio service area 71, that is, under the radio base station apparatus 51 is stored in the position information database section 5 in the exchange 1.

If a call is originated from the fixed terminal 11 to the mobile terminal 61 in this state (step S1), then the subscriber number storage section 3 in the exchange 1 reads the subscriber numbers of the origination side terminal and the termination side terminal from a call establishment signal from the fixed terminal 11 and temporarily stores them (step S2).

The terminal type discrimination section 4 discriminates based on the subscriber number data of the origination and termination side terminals stored in the subscriber number storage section 3 whether each of the terminals is a fixed terminal or a mobile terminal.

In this instance, if the subscriber number has 11 figures beginning with "090", then the terminal is a portable telephone set, but if the subscriber number has 11 figures beginning with "070", then the terminal is a PHS (Personal Handyphone System) terminal, in Japan. Based on this fact, the terminal type discrimination section 4 discriminates such mobile terminals as just described from other fixed terminals (step S3).

Since the termination side terminal is the mobile terminal 61, the terminal type discrimination section 4 refers to the position information data of the position information database section 5 and determines that the mobile terminal 61 is currently present in the radio service area 71, that is, under the radio base station apparatus 51 (step S4).

On the other hand, since the origination side terminal is the fixed terminal 11, origination side terminal position information is not registered in the position information database section 5.

Then, the mobile terminal 61 is called through the radio base station apparatus 51 based on the position information. Then, if a response is received from the mobile terminal 61, then a communication path is established and communication is performed between the fixed terminal 11 and the mobile terminal 61 (step S5).

Here, the communication end discrimination section 6 confirms a disconnection sequence to discriminate whether or not a normal sequence (disconnection release completion of release) has been followed upon completion of the call (step S6). If the call is completed normally, then the communication comes to an end without any trouble. However, if the radio circuit is disconnected and the communication is interrupted as a result of movement of the mobile terminal 61 out of the radio service area 71 during communication, by deterioration of the radio circuit condition or from some other reason, then it is determined that the communication has ended abnormally.

In this instance, the automatic call origination control section 7 originates a call to the origination side/termination side terminals based on the subscriber number data of the origination and termination side terminals stored in the subscriber number storage section 3 and the current position information of the mobile terminal 61 stored in the position information database section 5 to call the terminals.

In particular, the automatic call origination control section 7 calls the fixed terminal 11 which is the origination side terminal (step S7) and simultaneously calls the mobile terminal 61 which is the termination side terminal through the radio base station apparatus 51 (step S8).

If a response is received from both terminals, that is, from both of the fixed terminal 11 and the mobile terminal 61 (steps S9 to S11), then communication is re-started (step S12). However, if it is discriminated that no response is received from the fixed terminal 11 which is the origination side terminal, then the processing advances from step S9 to step S13. On the other hand, if it is discriminated that no response is received from the mobile terminal 61 which is the termination side terminal, then the processing advances from step S10 to step S14.

When no response is received from the fixed terminal 11 or the mobile terminal 61 in this manner, the calling to the fixed terminal 11 or the mobile terminal 61 is repeated until a time set in advance in the timer section 8 elapses (step S13 or S14).

Here, if no response is received from at least one of the terminals, then communication is not re-started.

On the other hand, if a response is received from both of the fixed terminal 11 and the mobile terminal 61 (step S11) as described above, them communication is restarted (step S12) as described above. In this instance, the processing returns from step S12 to step S6, in which it is supervised by the communication end discrimination section 6 to discriminate whether or not the communication has ended normally (step S6).

This routine is repeated until the communication between the origination side terminal (fixed terminal 11) and the termination side terminal (mobile terminal 61) ends normally.

The operation of the mobile terminal communication system described above similarly applies also where both of the origination and termination side terminals are mobile terminals. In this instance, it is assumed that, in FIG. 1, the mobile terminal 61 as the origination side mobile terminal and the mobile terminal 6N as the termination side mobile terminal are present in the radio service area 71 and 7N, respectively, and position information of the terminals is stored in the position information database section 5.

In particular, after a call is established (step S1), the subscriber numbers of the mobile terminals 61 and 6N are temporarily stored into the subscriber number storage section 3 (step S2).

In this instance, it is discriminated in steps S31 and S3 that the origination side terminal is the mobile terminal 61 and that the termination side terminal is the mobile terminal 6N, respectively.

Then, as the position information of the mobile terminal 61 and the mobile terminal 6N, the position information in the position information database section 5 is referred to (steps S41 and S4).

Then, call/response/communication are performed (step S5). Then, if the communication does not end normally because of radio circuit interruption or some other cause during the communication (step S6), then the automatic call origination control section 7 calls the mobile terminals 61 and 6N based on the subscriber numbers of the mobile terminals 61 and 6N and the current position information (steps S7 and S8).

If both of the mobile terminals 61 and 6N respond (steps S9, S10 and S11), then communication is re-started (step S12).

Here, if no response is received in the processing steps S9 and S10 for discrimination between presence and absence of a response from the mobile terminals 61 and 6N until timeout occurs with the timer section 8 (steps S13 and S14), then communication is not re-started similarly as described hereinabove.

Now, operation when the mobile terminal 61 or 6N goes out into another radio service area during communication or after interruption of communication is described.

As an example, it is assumed that a call is terminated at the mobile terminal 61 in a situation wherein the mobile terminal 61 has position registration in the radio service area 71.

Here, the mobile terminal 61 responds to the call and enters communication. Here, it is further assumed that, during the communication, the mobile terminal 61 moves out of the radio service area 71 into the neighboring radio service area 72 (not shown in FIG. 2).

In this instance, handover, which is a conventional technique, prevents the call from being disconnected and prevents the communication from being interrupted.

Figure 3:
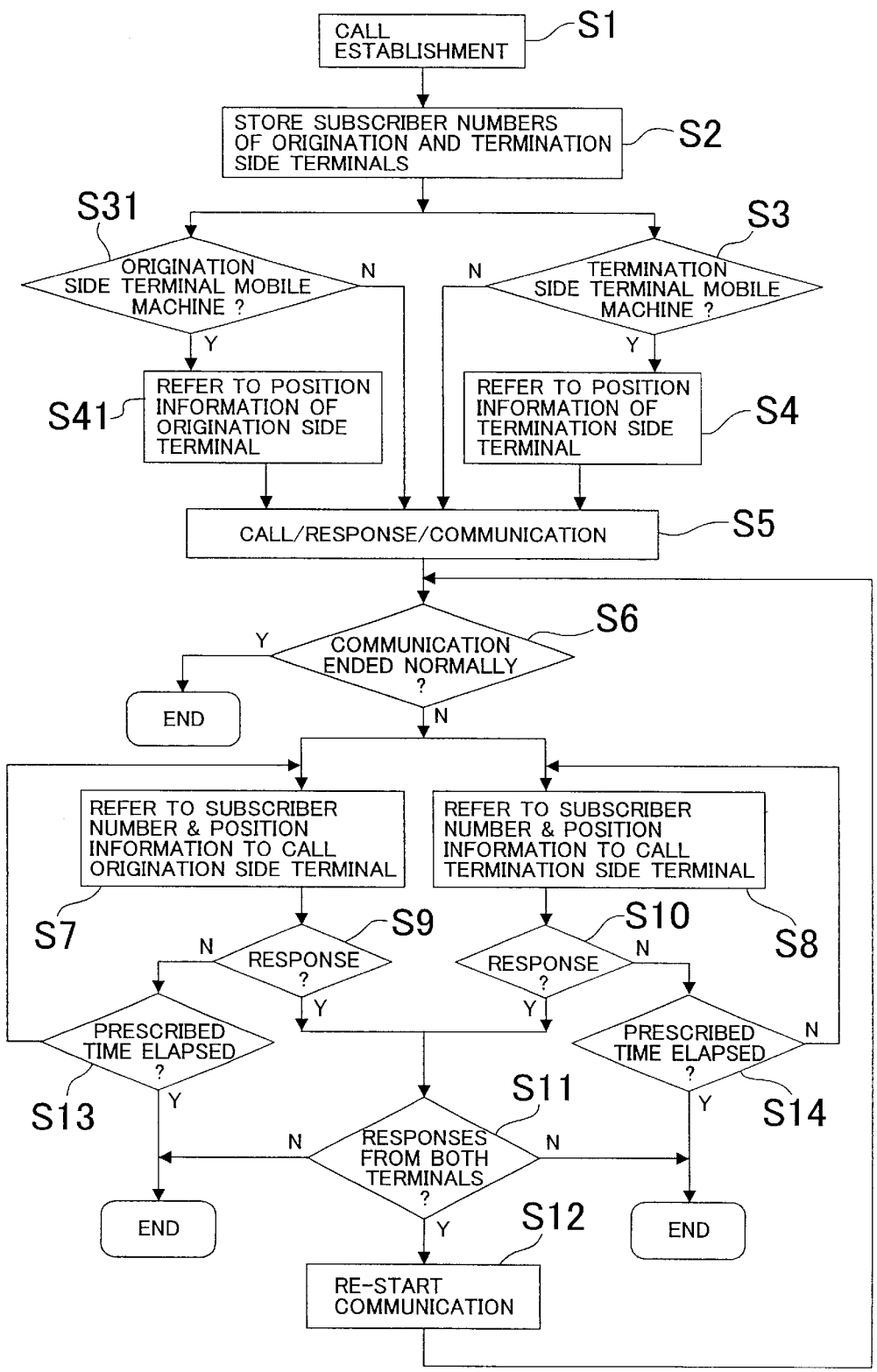
FIG. 3 is a flow chart illustrating operation of the mobile terminal communication system shown in FIG. 1.

Even if the handover results in failure, it is discriminated in step S6 of FIG. 3 that the communication has ended abnormally, and the mobile terminal 61 which has performed position re-registration in the radio service area 72 is called (step S8). Then, if a response is received from both of the origination and termination side terminals, then communication is re-started.

This similarly applies also when a mobile terminal moves into another radio service area after occurrence of interruption of the communication, and the new position information which was stored into the position information database section 5 in response to a position registration request in the new radio service area after the movement is referred to to call the mobile terminal (step S7).

While a preferred embodiment of the present invention has been described using specific terms, such description is for illustrative purposes only, and it is to be understood that changes and variations may be made without departing from the spirit or scope of the following claims.

What is claimed is:

1. A mobile terminal communication system which allows radio communication between a mobile terminal and another communication terminal through a radio base station apparatus, comprising:
   a subscriber number storage section provided in an exchange, which is a higher-rank apparatus than said radio base station apparatus, for temporarily storing subscriber numbers of origination and termination side terminals;

a terminal type discrimination section provided in said exchange for discriminating from the subscriber numbers whether each of said communication terminals is a fixed terminal or a mobile terminal;

a position information database section provided in said exchange for storing, when a result of the discrimination by said terminal type discrimination section indicates that any of said communication terminals is a mobile terminal, current position information of the mobile terminal based on a position registration request signal from the mobile terminal;

a communication end discrimination section provided in said exchange for discriminating whether or not the communication between the terminals has ended normally or abnormally;

an automatic call origination control section provided in said exchange for automatically calling the terminals when a result of the discrimination by said communication end discrimination section indicates that the communication between the terminals has ended abnormally, wherein, when a radio circuit is disconnected by deterioration of a radio circuit condition causing interruption of the communication while the communication is proceeding between the origination side terminal and the termination side terminal, said automatic call origination control section automatically originates a call to the terminals based on the subscriber number information stored in said subscriber number storage section and radio service area information of an area or areas in which the mobile terminal or terminals are present stored in position information database section, and re-starts communication if a response is received from both of the terminals; and a timer section for causing said automatic call origination control section to operate for a fixed period of time.

2. A mobile terminal communication system as claimed in claim 1, wherein, if any of the terminals moves into a different radio service area after it is discriminated that the communication between the terminals has ended abnormally, then said automatic call origination control section refers to new position information, which is stored into said position information data base section when the terminal issues a position registration request in the radio service area after the movement, to call the mobile terminal having moved to the different radio service area.

3. A mobile terminal communication system as claimed in claim 1, wherein, if any of the terminals does not respond within an automatic call origination time set in said timer section in advance, then said automatic call origination control section stops the terminal calling operation when the automatic call origination time elapses with said timer section.

* * * * *